March 15, 1932.   U. V. D'ANNUNZIO ET AL   1,850,001
METHOD OF EXTRACTING JUICES FROM CITROUS FRUITS
Original Filed May 3, 1930   5 Sheets-Sheet 1
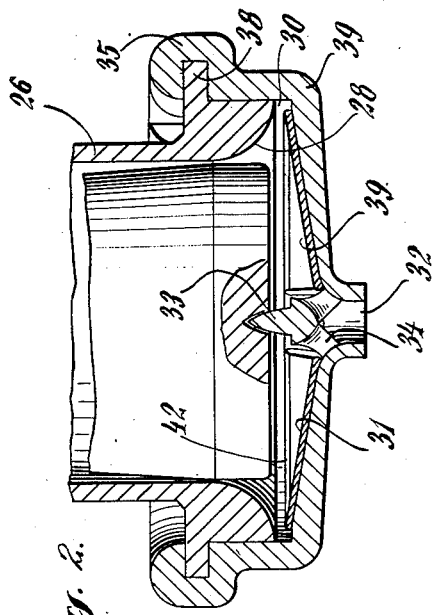
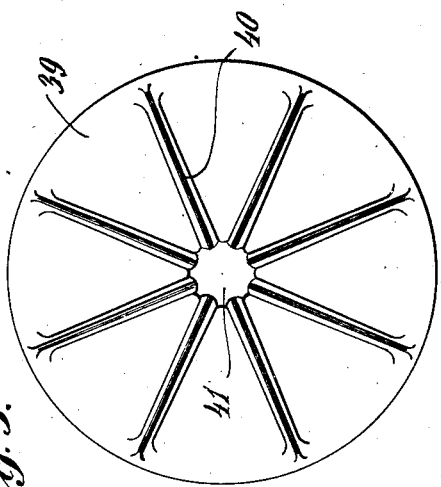
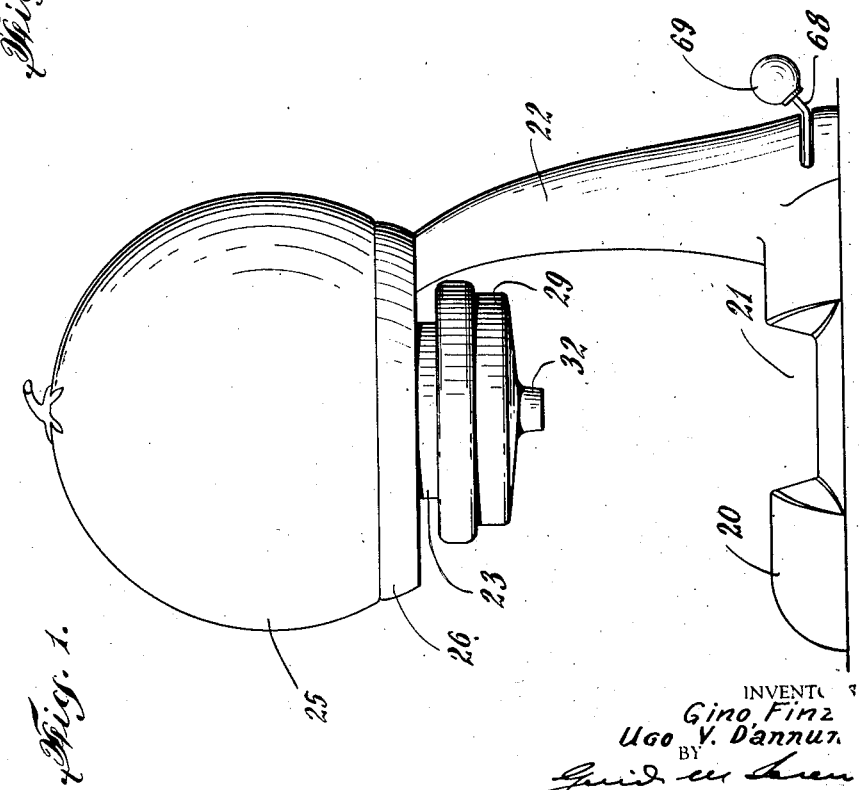
INVENTORS
Gino Finz
Ugo V. D'annunzio
BY
ATTORNEY March 15, 1932.   U. V. D'ANNUNZIO ET AL   1,850,001
METHOD OF EXTRACTING JUICES FROM CITROUS FRUITS
Original Filed May 3, 1930   5 Sheets-Sheet 2
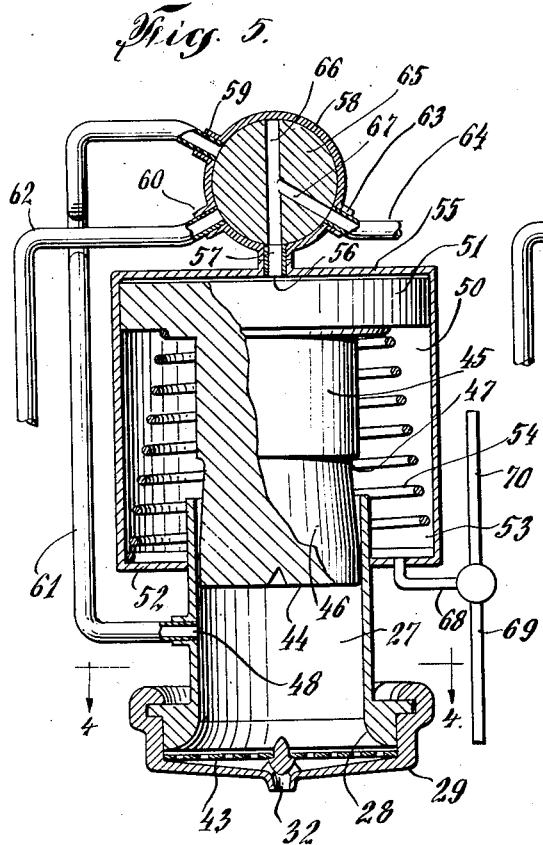
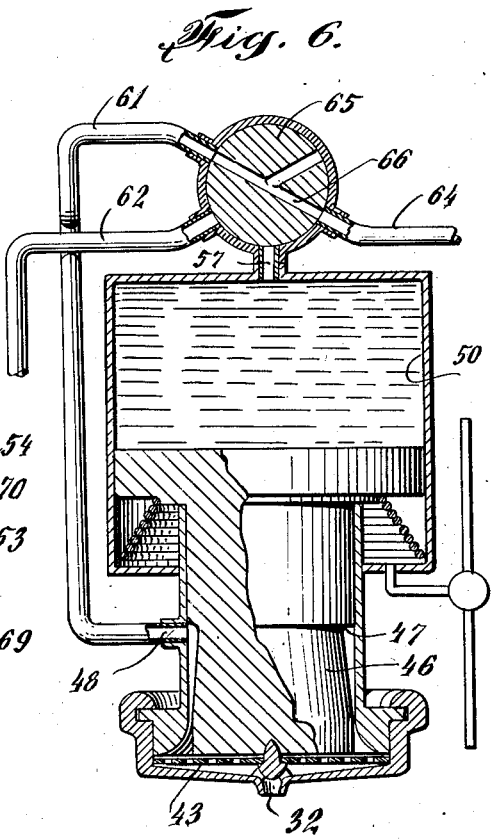
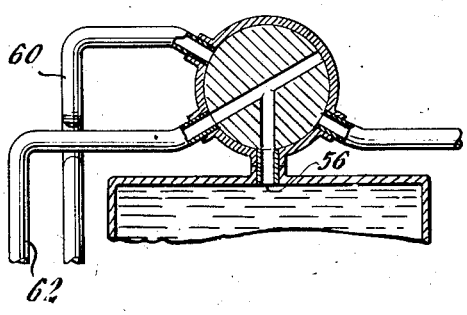
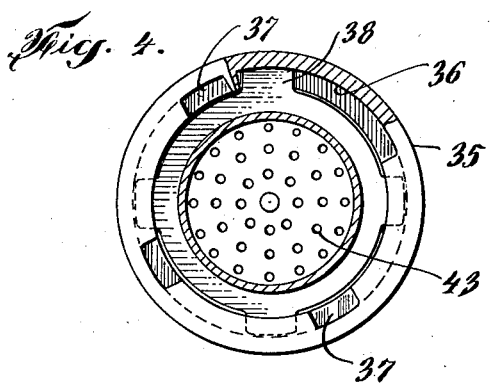
INVENTORS
Gino Finzi
Ugo V. D'annunzio.
BY
ATTORNEY

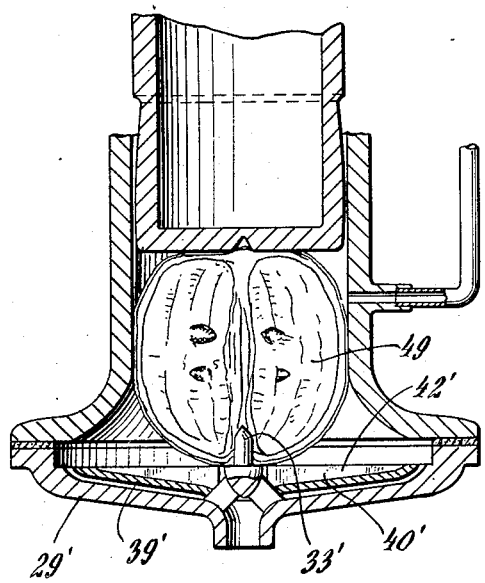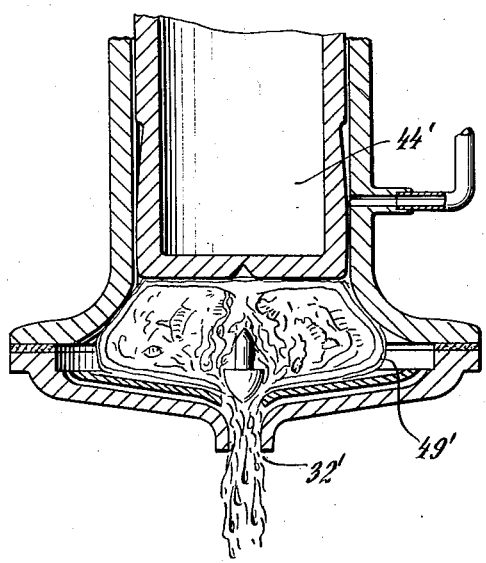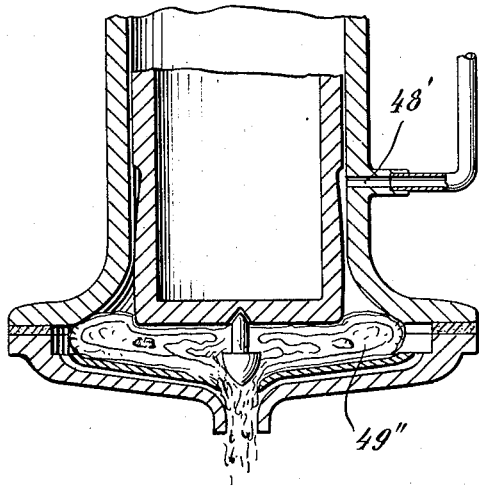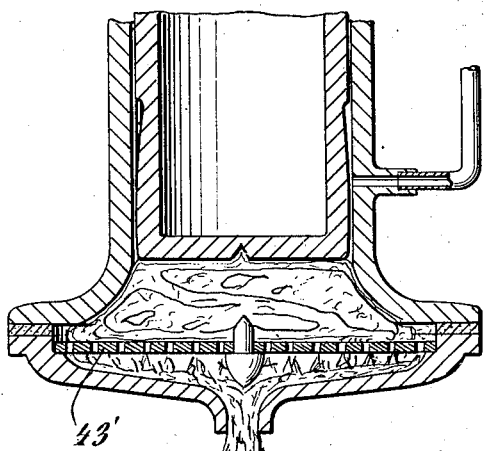

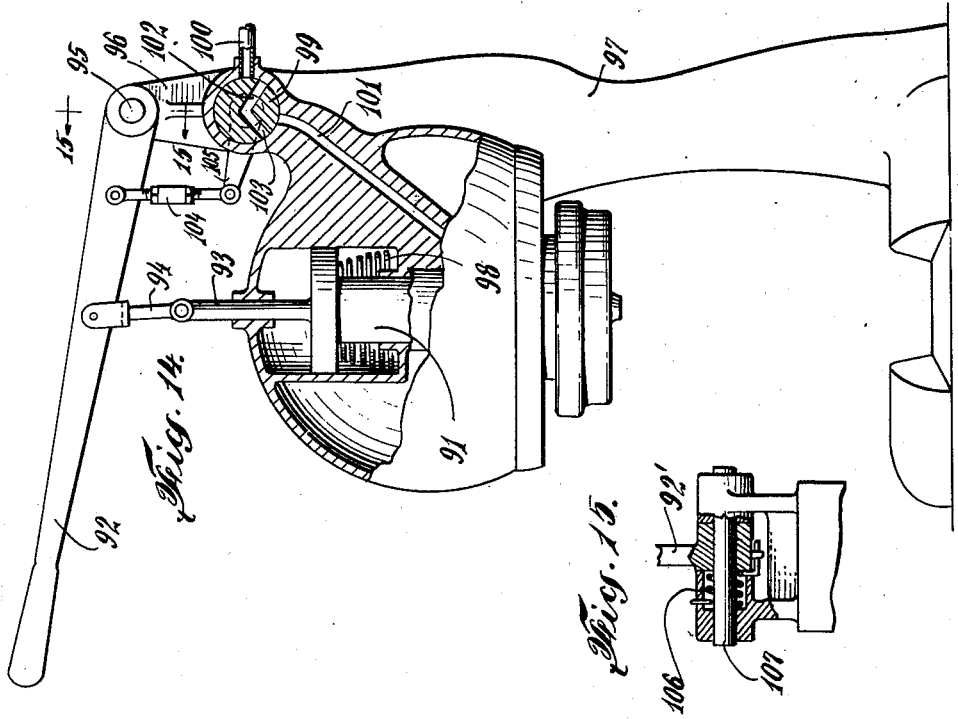
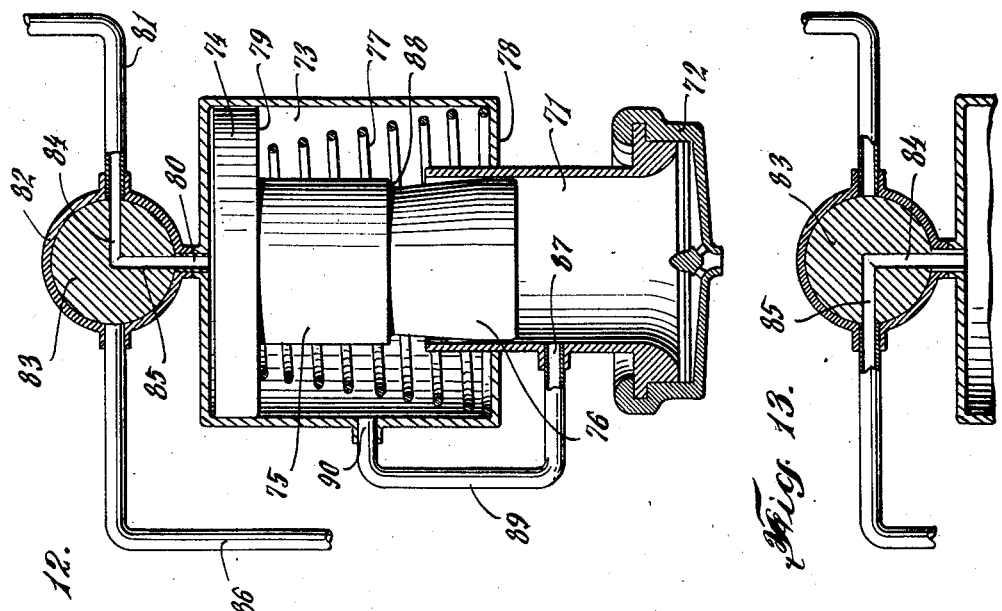

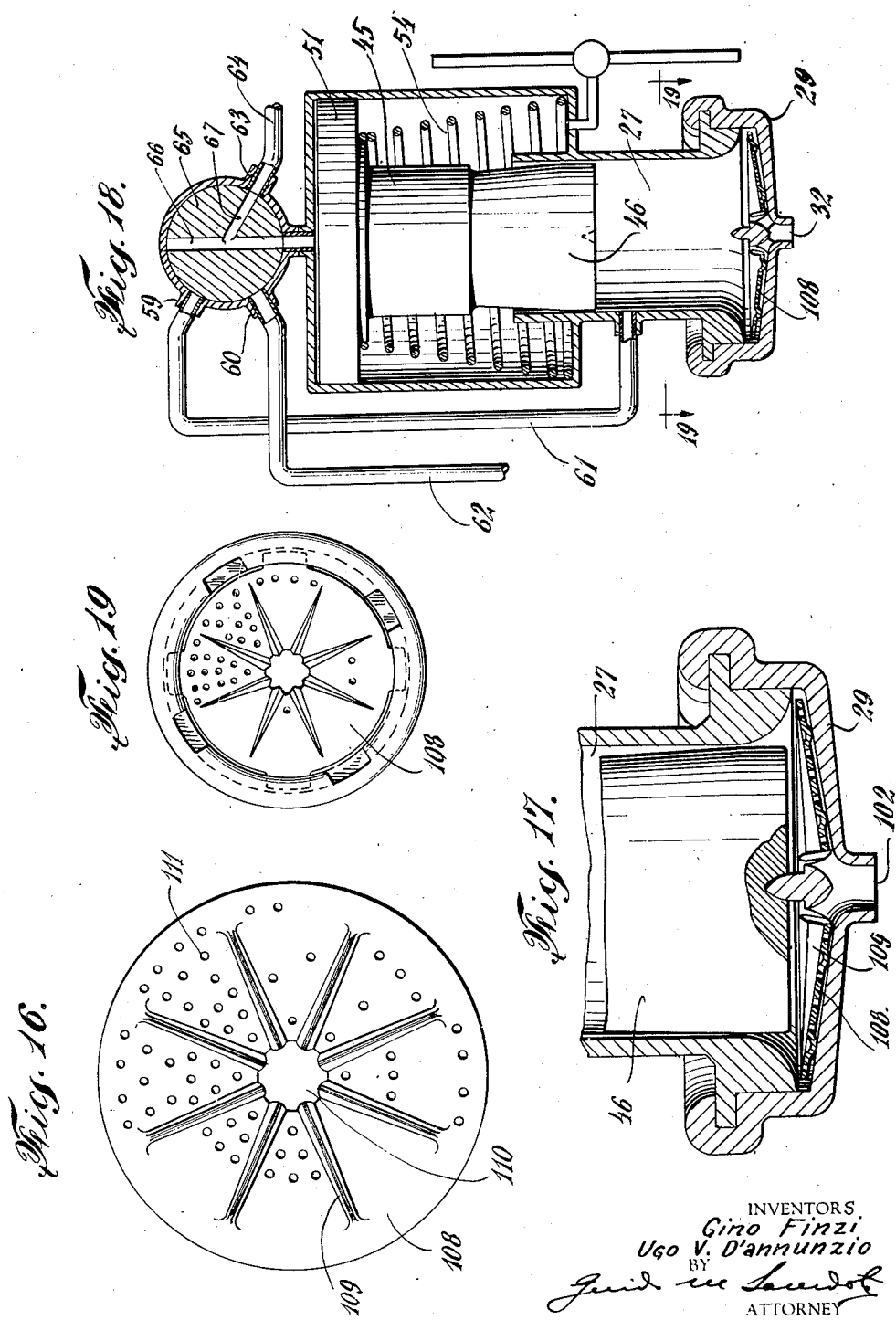

Patented Mar. 15, 1932

1,850,001

UNITED STATES PATENT OFFICE

UGO V. D'ANNUNZIO, OF NEW YORK, N. Y., AND GINO FINZI, OF MILAN, ITALY

METHOD OF EXTRACTING JUICES FROM CITROUS FRUITS

Application filed May 3, 1930, Serial No. 449,421. Renewed December 26, 1931.

This invention relates to the art of extracting juice from fruits and more particularly refers to improvements in methods of extracting juice from citrous fruits such as oranges, lemons, etc.

Most of the devices used for this purpose known to us are based upon the action of a ribbed conoidal bulb which is gradually forced within the halved orange or lemon while either the bulb itself or the halved fruit is rotated so as to cause an abrasive action to take place between the ribs of the bulb and the juicy substance of the fruit.

We have found that although machines of this type are adapted for very quick operation, and extract practically all the juice from the fruit, they are to a certain extent objectionable in various respects. For instance, the juice obtained by the use of these machines will usually contain in suspension a large number of tiny whitish particles due to the grinding of the white stratum of the skin and at times even pieces of seeds.

Besides marring the taste of the juice, these particles detract from the health giving qualities of the drink and cause the same to acquire an unattractive cloudy appearance. The main fault of this method of juice extraction however, lies in the impossibility of utilizing even to a small degree the essential and aromatic contents of the external colored portion of the skin which are richest in vitamins and are at the same time richest in flavor.

Methods of extraction whereby the halved fruit is pressed by hand against a rotating bulb are also somewhat objectionable from the standpoint of sanitation because the fruit is subjected to too much handling and also because as a rule particles of seeds and of the fibrous components of the fruit will adhere to the surface of the bowl at least until they are detached by a succeeding liquid spray and discharged in a drink subsequently prepared for another customer. If the machine should remain idle for any length of time, these adhering particles may spoil and impart to the drink a disagreeable taste.

The primary object of the present invention is to provide a novel and improved method of extracting juice from citrous fruits, whereby the juice contained in the fruit may be completely extracted in a clear condition, entirely free of solid particles originating from the breaking up of the seeds or skin.

Another object is to provide a novel and improved method of extracting juice from citrous fruits whereby the entire juice contents of the fruit are extracted in a clear condition, together with a certain proportion of the essential and aromatic oils contained in the outer portion of the skin.

Other objects and advantages of the present invention will more fully appear as the description proceeds and will be set forth and claimed in the appended claims.

According to our method the fruit from which the juice is to be extracted is not cut in half but is placed whole within a chamber where it is subjected to pressure while one of its ends is split in the center and preferably also along a number of directions radiating therefrom, in order to facilitate the gradual compression and ultimate flattening of the fruit.

While the fruit is subjected to pressure the juice filters through the slits produced through its skin by suitably sharp elements provided in the machine, but the seeds and other solid matters remain imprisoned within the flattened skin, so that the refuse matters will ultimately be compacted in a single disk shaped lump which can be easily removed and dumped out.

The pressure is applied to the fruit externally and this results in the squeezing out not only of the juice contained in the pulp but also of part of the essential and aromatic oils contained in the skin. A drink prepared with the juice thus extracted will therefore be rich in vitamins and will also have a flavor which cannot possibly be obtained when machines of the revolving bulb type are employed.

Various ways of carrying our invention into practice are illustrated by way of example in the accompanying drawings, in which:—

Fig. 1 is a side elevation illustrating the general appearance of a device embodying our invention;

Fig. 2 is a fragmentary vertical section in an enlarged scale of the lower part of the pressing chamber showing the removable bottom therefor;

Fig. 3 is a plan view of a removable disk provided with a plurality of radial ribs formed with a cutting edge, adapted to be placed upon the removable bottom;

Fig. 4 is a horizontal section partly broken away through line 4—4 of Fig. 5 showing the manner of inserting and retaining the removable bottom in position;

Fig. 5 is a partly diagrammatic vertical section of the operating parts of a hydraulically operated device embodying some of the features of our invention, showing the pressure exerting member in its normally raised position;

Fig. 6 is a similar view illustrating the pressure exerting member in its extreme lowered position;

Fig. 7 is a detail diagrammatic view illustrating the multiple way valve in the position where water may be discharged from the piston chamber;

Fig. 8 is a fragmentary vertical section of the lower part of the pressing chamber, showing the pressure exerting member at the beginning of its downward stroke, illustrating a bottom portion of a somewhat different design;

Fig. 9 is a similar view illustrating the pressure exerting member at an intermediate position of its downward stroke;

Fig. 10 is a similar view illustrating the pressure exerting member at the end of its downward stroke;

Fig. 11 is a view similar to that of Fig. 9 showing a perforated disk used in place of the radially ribbed disk shown in Figs. 8, 9, 10;

Fig. 12 is a partly diagrammatic vertical section of the operating parts of a hydraulically operated device of a somewhat modified design;

Fig. 13 is a fragmentary partly diagrammatic vertical section illustrating another position of the multiple way valve shown in Fig. 12;

Fig. 14 is a side elevation partly broken away and sectioned of a hand operated device also embodying certain features of our invention;

Fig. 15 is a detail rear view in elevation partly broken away and sectioned through line 15—15 of Fig. 14 showing an alternative arrangement of return spring for the working parts used in the device of Fig. 14;

Fig. 16 is a plan view of a ribbed disk similar to that shown in Fig. 3 provided with perforations;

Fig. 17 is a fragmentary vertical view of the lower part of the pressing chamber, showing the disk of Fig. 16 in position;

Fig. 18 is a partly diagrammatic vertical section similar to that of Fig. 5, illustrating the device equipped with a ribbed disk shown in Figs. 16, 17; and Fig. 19 is a horizontal section partly broken away through line 19—19 of Fig. 18.

The device illustrated comprises a base 20, preferably formed with a depression 21 forming a support for a glass or similar receptacle, a stand or upright 22 upwardly projecting from one side of said base, and an overhanging body portion 23 carried by said upright. Said body portion is vertically spaced from and located directly above depression 21, and is formed with a supporting flange 24 over which can be placed a dome 25 made of glass or any other suitable material, preferably shaped to simulate an orange, to indicate the use for which the device is intended.

The lower central part 26 of the body portion forms a vertical pressing chamber 27 open at its lower end and preferably formed with an outwardly flaring mouth 28, said mouth forming, with a removable bottom 29, a relatively shallow circumferential extension 30 of the pressing chamber.

Bottom part 29 is designed for quick insertion in or removal from the position shown in Figs. 1, 2, 4, 5, 6, in which it is shown forming a closure for the open end of chamber 27. The inner surface 31 of said bottom part is preferably slightly inclined downwardly towards a center outlet 32.

Bottom part 29 is also provided at the center with an upwardly projecting spiked member 33 made integral with supporting ribs 34 forming openings therein through which the juice can flow to outlet 32. By virtue of this arrangement, a citrous fruit such as a lemon or an orange may be forced over spiked member 33, when bottom part 29 is detached from the device and can then be inserted within the pressing chamber while bottom part 29 is set in its closing position.

Bottom part 29 may be secured in position by a slight twist, and to this end it is preferably formed with a flanged portion 35 having an inner circular groove 36, the upper surface of said flange having vertical slots or passages such as 37 through which may be inserted lugs such as 38 outwardly projecting from the lower end 26 of the body.

Bottom part 29 is shown in its operative position in Fig. 4. From the same it is apparent that if said bottom part is displaced a certain angular distance in a clockwise direction from the position shown, openings or slots 37 will come to register with lugs 38 and part 29 can then be moved away from the lower end of part 26.

Before the fruit is inserted over spiked member 23, a removable disk is preferably placed within the bottom portion 29, said disk being preferably of the type shown in Figs. 2 and 3 where 39 designates the body of the disk which is slightly funnel shaped to fit the inner surface 31 of bottom part 29, and 40 designates a plurality of ribbed members radially extending over body portion 39 from a central opening 41 and upwardly projecting from said body portion, said rib members being formed with a cutting upper edge 42.

Although we prefer in most cases to use a ribbed disk such as shown in Figs. 2 and 3, it is possible if desired to use instead a perforated disk 43 as shown in Figs. 4, 5, 6, although such an arrangement is not as effective and requires the use of greater pressures. A pressure exerting member 44 is provided at the upper end of chamber 27, said member 44 being mounted for vertical downward displacement within said chamber. Said pressure exerting member is preferably composed of an upper portion 45 the diameter of which is substantially equivalent to the diameter of chamber 27, and a lower portion 46 the lower diameter of which is slightly smaller so as to provide a clearance between said lower portion and the inner surface of chamber 27, the surface of lower portion 46 being furthermore slightly inclined inwardly to form with the lower end of portion 45 a shoulder 47.

Chamber 27 is provided with an inlet 48 through its side which is located just below shoulder 47 when pressure-exerting member 44 occupies its lowermost position shown in Fig. 6. As stated, when bottom portion 29 is in its closing position its inner surface 31 is vertically spaced from the open mouth of chamber 27 and forms therewith a shallow laterally extending chamber 30 which provides room for the increased diameter acquired by the skin of the fruit when in its flattened condition.

This feature is clearly illustrated in Figs. 8, 9, 10 where the fruit is shown at various stages of the pressing operation. In Fig. 8 it is seen how a lemon or orange 49 after having been placed upon spiked member 33' of detachable bottom part 29', has been inserted within the pressing chamber.

In Fig. 9 the pressure exerting member 44' has been forced downwardly, pressing the fruit and forcing it to extend laterally as shown at 49', the juice coming out of the outlet 32'. The next stage of the pressing operation is shown in Fig. 10 where the skin of the fruit has been completely flattened out causing it to acquire a discoidal shape as shown at 49", the flattened skin retaining all the seeds and solid matters contained in the fruit, while the juice filters through the interstices between the edges of the slits produced by cutting edges 42' and the sides of ribbed members 40'.

In Fig. 11 is shown an intermediate stage of the pressing stroke where a perforated disk 43' is used in place of the ribbed disk 39'. In this case the pressure required is somewhat higher than that called for when a ribbed disk is employed because the fruit is only punctured in the center by the spiked member carried by the detachable bottom part.

After the pressing operation has been completed, and the pressure exerting member is in the position shown in Fig. 10, it is desirable to admit water under pressure through inlet 48' in order to discharge whatever juice may be left in the pressing chamber and at the same time to rinse and clean the surfaces of said chamber. After this the bottom part may be detached together with the refuse, and the latter can be quickly dumped out together with the detachable disk, this being replaced by a new disk, when making ready for a new operation.

The operations so far described are carried out in all types of machines embodying our invention, the method of operating said machines varying however, according to the kind of power used.

As stated in the premises we prefer to utilize for the operation of the pressure exerting member, the pressure of the water obtainable from any ordinary water supply system.

Fig. 1 and Figs. 4 to 7, illustrate a device designed for operation by hydraulic pressure. In said drawings the pressing chamber 27 which is open at the top in order to admit the pressure exerting member, projects downwardly from a piston chamber 50 within which may move a piston 51 integral with the pressure exerting member 45—46'. The upper part of chamber 27 projects upwardly from the bottom 52 of the piston chamber forming therewith an annular collecting chamber 53. A spring 54 interposed between the bottom of the piston chamber and the lower surface of the piston normally holds the piston and the pressure exerting member depending therefrom in their raised position shown in Fig. 5.

The top 55 of the piston chamber is provided with an inlet 56 through which water under pressure may be admitted to force down the piston against the action of spring 54. Said inlet is connected to one of the outlets 57 of a multiple way valve 58 which is provided with two other outlets 59, 60 connected by a tube 61 to inlet 48 and by a tube 62 to a place of discharge, respectively.

Said valve also is provided with an inlet 63 to which leads a water supply pipe 64, which may be connected to a water supply system in any suitable manner. Said valve also comprises a three way cock 65 having a cross passage 66 adapted to establish direct communication between inlet 63 and outlet 59 and having a branch passage 67 adapted together with passage 66 to establish communication between inlet 63 and outlet 57 or between outlet 57 and outlet 60. Said three way cock can be operated by means of a lever 68 provided with a ball handle 69 shown in Fig. 1.

In Fig. 5, the cock is shown in the position where water supplied through pipe 64 is admitted to the piston chamber through passages 67, 66. Due to the pressure of said water, the piston will be forced downwardly against the action of spring 54 to the position shown in Fig. 6, so that if an orange or lemon is inserted within chamber 27, it will be pressed between the lower surface of the pressure exerting member 44 and the ribbed or perforated disk 31 or 43. By properly proportioning piston 51 the device can be arranged to operate efficiently under all pressures normally used in water supply systems, that is between 20–80 pounds per square inch.

After the juice has been forced out of the fruit, the pressure exerting member having reached the position shown in Fig. 10, a spray of water is admitted to chamber 27 through inlet 48, said water rinsing the inside of chamber 27 and being discharged together with the residue of the juice within the glass or container underneath. This is done by turning cock 65 in a counterclockwise direction from the position shown in Fig. 5 to the position shown in Fig. 6 where direct communication is established by passage 66 between supply tube 64 and spray tube 61. Due to the small clearance between the outer surface of part 46 of the pressure exerting member and the internal surface of chamber 27, the water admitted through inlet 48 will acquire a whirling motion and a high velocity around chamber 27 and will thus efficiently rinse all parts of said chamber.

While water is thus admitted to chamber 27 the piston 51 and the pressure exerting member remain in their depressed position because the discharge of the water contained within the piston chamber is prevented by cock 65 blocking valve outlet 57.

As soon as the operator deems the water discharge through the outlet 32 to be sufficient for the requirements of the drink being prepared, he actuates lever 68 so as to turn cock 65 in a clockwise direction from the position shown in Fig. 6 to the position shown in Fig. 7, where direct communication is established between inlet 56 and discharge tube 62 by the passages 67—66 of the cock. Spring 54 is then free to expand, forcing piston 51 upwardly to the position shown in Fig. 5 while water is being expelled from the piston chamber through exhaust pipe 62. This being done, the removable bottom part 29 is detached and the refuse together with the removable disk is dumped out as previously explained. The device is thus ready for the next operation.

If any water should leak through between the side surface of the piston and the inner surface of chamber 50, it will collect within annular space 53 and will be discharged therefrom through outlet pipes 68—69, provided with a vent 70.

A hydraulically operated device of a somewhat different type is shown in Fig. 12 where 71 designates the pressing chamber provided with a removable bottom part 72, 73 designates the piston chamber, 74 the piston, and 75—76 the pressure exerting member depending from said piston. Like in the previous case, a spring 79 is interposed between bottom 78 of chamber 73 and the lower surface of the piston, said spring normally retaining piston 74 and pressure exerting member 75—76 in their uppermost position shown.

The piston chamber is provided with an inlet 80 which is shown connected to a water supply pipe 81 by a three way valve 82, the cock 83 of which has a right angle passage formed by two radial tracts 84, 85. By turning said cock 90 degrees in a clockwise direction from the position shown, communication will be established between inlet 80 of the piston chamber and exhaust pipe 86, as shown in Fig. 13.

When this is done the water contained in the piston chamber can be expelled through exhaust pipe 86 while spring 77 returns the piston and the pressure exerting member to their normal position.

Like in the previous case, the pressing chamber is provided with an inlet 87 just below the level reached by the shoulder 88 formed in the pressure exerting member at the point of connection between its upper portion 75 and its lower portion 76. Said inlet 87 is connected by a pipe 89 to an outlet 90 provided through the wall of the piston chamber just above the lowermost position reached by the upper surface of piston 74.

By virtue of this arrangement when water is admitted to the piston chamber, the piston will descend causing the pressing of the fruit to take place in the manner hereinbefore explained, and when the lowermost position of the piston has been reached, water within the piston chamber will automatically be discharged through pipe 89, into the pressing chamber, rinsing said chamber and causing the juice adhering to its surfaces to be discharged in the receptacle below. As soon as this is done, cock 83 is turned to the position of Fig. 13, and spring 87 will return the piston and pressure exerting member to their normal position. It is therefore sufficient to set the cock in one or the other of two extreme positions instead of successively setting it in three different positions as called for by the arrangement previously described.

It is, of course, also possible to operate the pressure exerting member independently of the pressure of the water available. For instance, in Fig. 14, we illustrate an arrangement where the force necessary to depress pressure exerting member 91 is exerted by a hand lever 92, connected to the stem 93 of said pressure exerting member by a link 94. Lever 92 is shown pivotally mounted at 95 onto a bracket 96 upwardly extending from the stand 97. A spring 98 normally retains the pressure exerting member and parts connected thereto in their uppermost position. It will be understood that independent means may be provided for flushing the pressing chamber after the juice has been forced out of the fruit.

On the other hand, it is also possible to cause the flushing operation to take place automatically upon the pressure exerting member reaching its lowermost position. A suitable arrangement to this end is illustrated in said Fig. 14 where 99 designates a two way cock which may establish or cut off communication between a water supply pipe 100 and a passage 101 leading to the pressing chamber.

Said cock 99 is provided with an angular passage formed by two radial tracts 102, 103 and is normally held in its inoperative position by a link 104 connecting lever 92 with an arm 105 attached to or integral with said cock.

When lever 92 is depressed, cock 102 is turned in a counterclockwise direction, and when lever 92 reaches its lowermost position, said cock will establish direct communication between water supply pipe 100 and passage 101, causing the pressing chamber to be flushed in the manner hereinbefore explained.

Lever 92 can then be released and spring 98 will automatically return all the parts to their normal position.

In Fig. 15 we show a possible modification of the device shown in Fig. 14 where the hand lever 92' is connected to a coil spring 106 coaxial with the pivot 107 of said lever, said spring being used together with or instead of spring 98 to return the hand lever and parts connected thereto to their normal position.

It is, of course, also possible to make a ribbed disk such as shown at 39—40 provided with both cutting edges and perforations, as shown in Figs. 16, 17 where 108 is the disk provided with ribs 109 radially extending from a central opening 110 and with perforations 111. This disk is shown in connection with the device illustrated in Figs. 18, 19, which is in all other respects similar to that illustrated in Figs. 4, 5, and has its various other parts designated by reference characters corresponding to those of said Figs. 4 and 5.

From the foregoing it is seen that the pressure is applied externally of the fruit from beginning to end, so that not only is the juice forced out of the pulp but a certain proportion of the essential and aromatic oils contained in the skin is also extracted, said proportion depending upon the degree of pressure exerted and the extent of the downward stroke of the pressure exerting member. The amount of essntial and aromatic oils extracted can therefore be regulated by the operation of the means controlling the movement of the pressure exerting member, that is, the multiple way valve in the case of a hydraulically operated device or the hand lever in the case of a hand operated device.

Due to its simplicity, the device lends itself to a quick and efficient operation, and is entirely satisfactory from the standpoint of sanitation because its various surfaces coming into contact with the acid juices are thoroughly cleaned each time the device is operated. This feature is extremely important and constitutes an essential step of our method of extracting juice from citrous fruits. Its importance is due to the fact that the aromatic substances contained in the rind of oranges and lemons have a tendency to firmly adhere to the surfaces against which they are squirted during the squeezing process. It is well known that the chief constituents of these aromatic substances are three glucosides, hesperidin, isohesperidin and aurantiamarin, and an oil which mainly consists of a terpene known as limonene. The glucosides have a tendency to jell and to stick to the surface, and the oil renders the surface somewhat greasy and also is difficult to detach therefrom. It is therefore absolutely necessary that a jet of liquid having a high velocity be projected against the surfaces thus effected, immediately after the squeezing operation is performed, if a thorough cleansing of these surfaces is to be effected. The use of water merely as a rinsing agent is not sufficient for an efficient operation, because these aromatic substances are not easily dissolved by water; the impact of water or other liquid due to its relatively high velocity, is therefore in practice, a more important factor.

Devices other than those illustrated and described may be made embodying our inventive idea without departing from the spirit of our invention; the drawings will therefore be understood as being intended for illustrative purposes only, and not in a limiting sense. Accordingly, we reserve the right to carry our invention into practice in all those ways and manners which may enter, fairly, into the scope of the appended claims.

We claim:

1. The method of recovering juices and essential and aromatic liquid substances from the pulp and skin of citrous fruit which comprises subjecting the whole fruit to external pressure so as to force out the juice therefrom, while the fruit is forced against a sharp body within a substantially closed chamber having a discharge outlet, causing the juice to filter between the edges of the punctured skin and the surface of the sharp body, gradually flattening the skin of the fruit, retaining therein the seeds and other solid matters therein contained, at the same time squeezing out of the skin essential and aromatic liquid substances therein contained, immediately thereafter directing a stream of liquid at a relatively high velocity against the walls of the chamber where the pressing of the fruit takes place, sweeping the surfaces coming in contact with the juice thereof, and with the said essential and aromatic substances, and collecting the mixed juice, essential and aromatic substances and liquid issuing from said chamber.

2. The method of recovering juices and essential and aromatic liquid substances from the pulp and skin of citrous fruit which comprises puncturing the whole fruit, subjecting the whole fruit to external pressure so as to force out the juice therefrom while the fruit is forced against the puncturing agent within a substantially closed chamber provided with a discharge outlet, causing the juice to filter between the edges of the punctured skin and the surface of the puncturing agent, gradually flattening the skin of the fruit, retaining therein the seeds and other solid matters therein contained, at the same time squeezing out of the skin essential and aromatic liquid substance therein contained, subsequently immediately directing a whirling stream of liquid at a relatively high velocity against the walls of the chamber where the pressing of the fruit takes place, said stream sweeping the surfaces coming in contact with the juice thereof, and with the said essential and aromatic substances and collecting the mixed juice, essential and aromatic substances, and liquid issuing from said chamber.

3. The method of recovering juices and essential and aromatic liquid substances from the pulp and skin of citrous fruit which comprises subjecting the whole fruit to skin puncturing and juice extracting pressure, gradually flattening the skin of the fruit, retaining therein the seeds and other solids therein contained, at the same time squeezing essential and aromatic liquid substances from the skin, and, while maintaining said pressure, flushing the fruit and the chamber where the pressing of the fruit takes place with a liquid.

UGO V. D'ANNUNZIO.
GINO FINZI.